E. A. PECK.
BRAKE BLOCK HOLDER.
APPLICATION FILED AUG. 8, 1911.
1,027,390.
Patented May 21, 1912.
FIG_1_
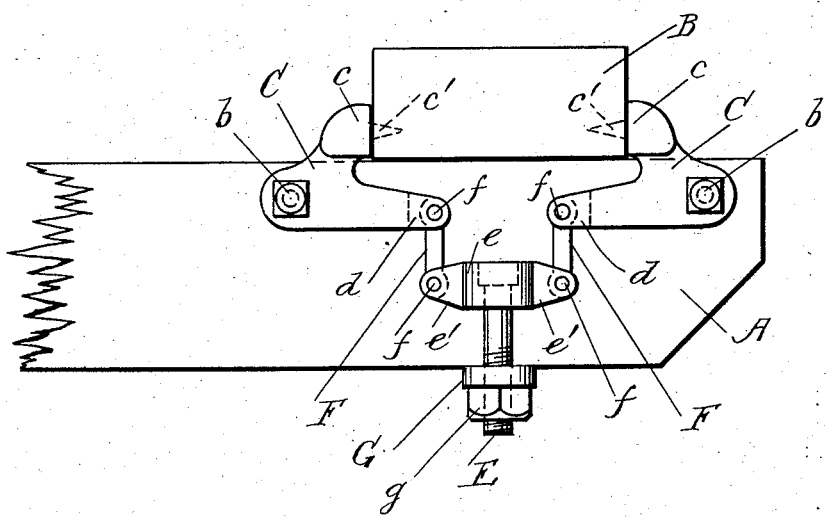
FIG_2_
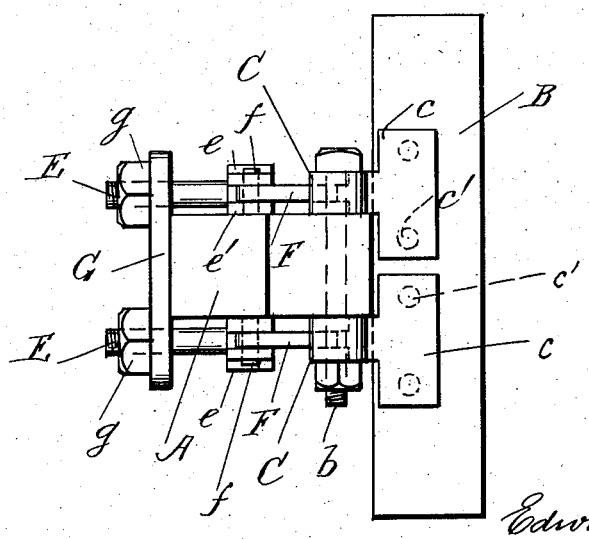
Witnesses
Wm H. Bates
W. E. Allen
Inventor
Edwin A. Peck,
By Herbert W. Jenner.
Attorney

UNITED STATES PATENT OFFICE.

EDWIN A. PECK, OF DENVER, COLORADO, ASSIGNOR OF ONE-HALF TO ALBERT R. CORN, OF DENVER, COLORADO.

BRAKE-BLOCK HOLDER.

1,027,390.  Specification of Letters Patent.  Patented May 21, 1912.

Application filed August 8, 1911. Serial No. 643,024.

*To all whom it may concern:*

Be it known that I, EDWIN A. PECK, a citizen of the United States, residing at Denver, in the county of Denver and State of Colorado, have invented certain new and useful Improvements in Brake-Block Holders; and I do hereby declare the following to be a full, clear, and exact description of the invention, such as will enable others skilled in the art to which it appertains to make and use the same.

This invention relates to fastening devices for connecting a brake block to the brake beam or lever of a vehicle; and it consists in the novel construction and combination of the parts hereinafter fully described and claimed which permits of a new block being quickly substituted for one which is worn out.

In the drawings, Figure 1 is a plan view of an end portion of a brake beam showing the fastening devices which engage with the brake block. Fig. 2 is an end view of the same.

A is a portion of a brake beam or lever such as commonly used on vehicles or cars.

B is the brake block.

C are four similar bell-crank levers pivoted to the brake beam by pins or bolts $b$. These bell-crank levers have at one end jaws $c$ provided with projections $c'$ for penetrating the block, and they are arranged in pairs. One pair of jaws is pivoted at one side of the brake beam, and the other pair is pivoted at the other side of the brake beam. The bell-crank levers have double-eyes $d$ at their other ends which project toward each other at the back of the brake block.

E are two clamping bolts. Each bolt E has a crosshead $e$ provided with double-eyes $e'$ at its ends.

F are links provided with pivot pins $f$ which connect them with the double-eyes $e'$ and $d$.

G is a plate provided with holes for the bolts E, and arranged on the other side of the brake beam from the brake block.

Nuts $g$ are screwed on the bolts E, and when these nuts are screwed up they cause the jaws of the bell-crank levers to grip the brake block tightly, and they also clamp the bell-crank levers securely to the brake beam. When the brake block is worn out the jaws are unclamped from it, and a new brake block is put in its place.

What I claim is:

1. The combination, with a brake beam, and a brake block; of bell-crank levers pivoted in pairs on opposite sides of the beam and provided with jaws at one end for engaging with the brake block, a plate arranged on the other side of the beam from the brake block, and clamping bolts provided with nuts and operatively connected with the said plate and the other ends of the said bell-crank levers.

2. The combination, with a brake beam, and a brake block; of bell-crank levers pivoted in pairs on opposite sides of the beam and provided with jaws at one end and double-eyes at the other end, a plate arranged on the other side of the beam from the brake block, clamping bolts provided with nuts and engaging with the said plate and provided also with crossheads having double-eyes at their ends, and links pivotally connecting the double-eyes of the crossheads with the double-eyes of the bell-crank levers.

In testimony whereof I have affixed my signature in the presence of two witnesses.

EDWIN A. PECK.

Witnesses:
 MAX H. METZNER,
 MATTHEW C. BRADLEY.

Copies of this patent may be obtained for five cents each, by addressing the "Commissioner of Patents, Washington, D. C."